June 17, 1941.  B. PAUL  2,245,603

CONDENSER TESTER

Filed June 13, 1938

INVENTOR.
BENJAMIN PAUL,
BY
ATTORNEY

Patented June 17, 1941

2,245,603

UNITED STATES PATENT OFFICE 2,245,603

CONDENSER TESTER

Benjamin Paul, Los Angeles, Calif.

Application June 13, 1938, Serial No. 213,479

1 Claim. (Cl. 175—183)

My invention relates to a condenser tester, for testing condensers such as used in radios, automobiles, radios, and the like.

All devices for testing condensers for automobiles, radios, and the like, are made of such nature that they can only be used on domestic or ordinary lighting circuits. With present methods, condensers, used in automobiles or other equipment using battery currents, must be removed from the automobile or other equipment, and taken to a large testing apparatus connected to such domestic or lighting circuits.

One of the principal objects of this invention is to provide a device or tester which may be connected quickly to the battery of the automobile or other equipment, for testing a condenser or condensers while in place on the same automobile or equipment.

An object also of this invention is to provide a device or tester of this class which is easy to handle, efficient, and accurate in its operation, simple and economical of construction, and which will not readily deteriorate or get out of order.

With these and other objects in view, as will appear hereinafter, I have devised a device or apparatus of this class having certain novel features of construction, combination, and arrangement of parts and portions, as will be hereinafter described in detail, and set forth in the appended claim, reference being had to the accompanying drawing and to the characters of reference thereon, which form a part of this application, in which:

Figure 1:
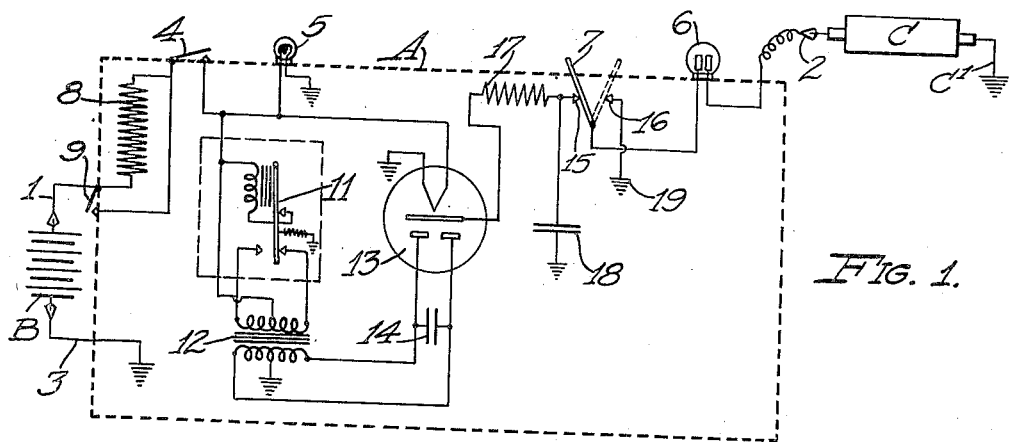
Fig. 1 is a schematic view and wiring diagram of a condenser tester embodying my invention in a preferred form.

In all of the forms of construction, shown in the drawing, the whole apparatus is preferably inclosed in a box A with the showing only of a battery terminal 1, a condenser terminal 2 (to which the condenser, to be tested, is to be attached), a ground terminal 3, a main or on-off switch 4, a signal light 5, by which one may determine whether or not the apparatus is functioning, a test indicator 6, and a manually operated switch 7, by which may be determined the condition of the condenser to be tested.

Fig. 1 of the drawing shows a schematic view and wiring diagram of my device or tester in a preferred form. The tester is shown connected to a battery B, which may be the usual battery of the automobile or other equipment, to which is connected the condenser to be tested, the battery being connected to the terminals 1 and 3 of the tester. The terminal 2 is connected to the condenser C, to be tested. This condenser C may remain in the original circuit and may be grounded at $C^1$.

The remaining portion of the apparatus will be described in connection with its operation to determine whether or not, or to what degree, the condenser, to be tested, is shorted. To operate the tester, the main switch 4 is closed, thereby lighting the signal bulb 5 which is connected in multiple to the circuit. When the switch 4 is closed the battery current passes through the vibrator 11, interrupting the current, which is then stepped up through a transformer 12 to an alternating current of from 200 to 250 volts, and then rectified through the rectifier tube 13. In this instance a full wave rectifier tube is used and connected to the opposite ends of the transformer. A buffer condenser 14 may be placed between the terminals of the transformer.

The shiftable blade or member of the double-throw switch 7 is permanently connected to the test indicator 6, which, in this instance, is a neon tube, commercially known as a glow lamp, which is provided with spaced plane electrodes. The shiftable member of the switch 7 may be manually oscillated between contacts 15 and 16. The former is connected to the output of the rectifier tube in series with a protective resistor 17. This contact is also connected, through a filter condenser 18, to ground; while the contact 16 is directly grounded at 19. The size of the filter condenser 18 is determined by the size of the condenser C, which is to be tested.

When the switch 7 is in the solid line position, current from the rectifier passes to the condenser C, in order to charge the same. If the condenser C is in good condition, that is, O. K., such condition is indicated by periodic flashes on one of the electrodes of the neon tube 6, the period between the flashes indicating the normal gradual leakage of the condenser C. When the switch 7 is in the dotted line position, the condenser C becomes discharged at 19, indicated by a short but more luminous flash on the other electrode of the neon tube 6. When the switch 7 is in the solid line position, and when no flashes are made by the neon tube, such condition indicates the circuit of the condenser C to be open. While a continuously lighted neon tube indicates a shorted condenser. Indications between these two extremes of continuous light and intermittent flashes suggest varying degrees of conditions of the condensers tested.

Batteries of automobiles, and the like, are of different voltage. In order to compensate for this variation, so that my tester may be used on different automobiles or equipment without injury, I have provided a resistance coil 8 in the box A and a switch 9, when closed, short circuits the coil, but, when open, forces the battery current to pass through the resistor 8. These resistors and switches may be varied or duplicated as needed.

Figure 2:
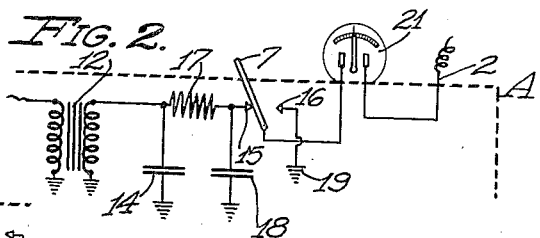
Fig. 2 is a fragmentary diagram showing the use of a modified form of indicator.

It is obvious that a suitable mechanical meter 21 may be employed in place of the neon indicator bulb 6. In such case, the rectifier tube is omitted, as shown in Fig. 2. Although the use of a meter provides for easier reading and determination of the condition of the condenser C, the cost of its employment is greatly increased.

Figure 3:
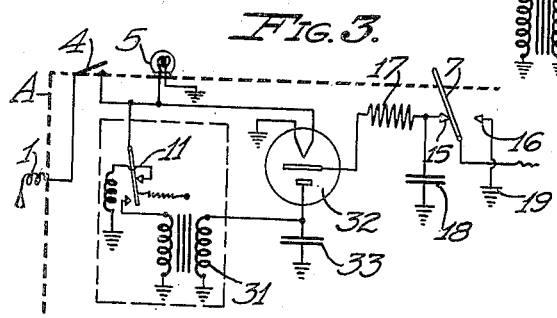
Fig. 3 is a fragmentary schematic view showing a simplified form of the apparatus of my invention.

It is further obvious that instead of the full wave transformer 12 being used, as described above, a simple transformer 31 may be used with a half wave rectifier tube 32, as shown in Fig. 3. In this hook-up the second terminals of the transformer secondary 31 and of the buffer condenser 33 are grounded.

Figures 4, 5:
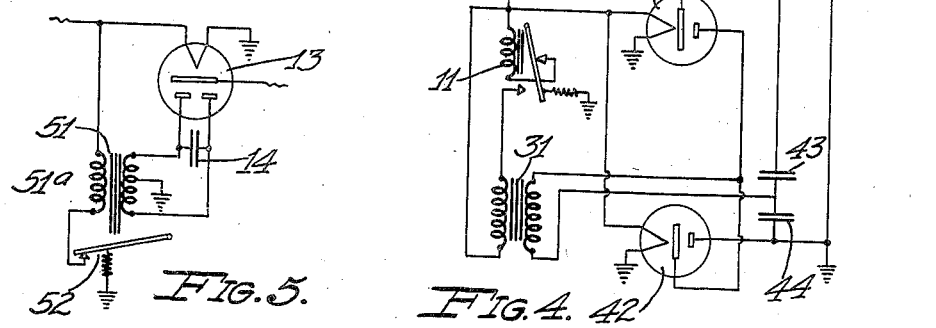
Fig. 4 is a schematic view of another modified form showing a multiple of simplified parts; and, Fig. 5 shows a modified construction of a vibrator and transformer.

In Fig. 4 of the drawing, I have shown a hook-up, intended to operate as efficiently as the structure in Fig. 1. In this modification, I have connected two half wave rectifier tubes 41 and 42 to the transformer secondary 31. As shown in the drawing, the plate of one tube and the cathode of the other are connected to one lead of the transformer, while the other plate and cathode of the tubes are connected to the output of the doubler condensers 43 and 44. The other lead of the transformer is connected to and between the condensers. A switch 7 is mounted to be shifted between two contacts 15 and 16 connected respectively to the output leads of the condensers 43 and 44. This type of circuit doubles the output voltage of the transformer.

In Fig. 5 of the drawing, I have shown a modified construction of the vibrator and transformer, in which the two are combined as a unit, the primary 51ª of the transformer 51 serving as the magnet for oscillating the resilient contact breaker arm 52. This unit may be employed in place of the vibrators and transformers described above.

Though I have shown and described a particular construction, combination, and arrangement of parts and portions, and certain modifications thereof, I do not wish to be limited to the same, but desire to include in the scope of my invention the construction, combination, and arrangement substantially as set forth in the appended claim.

I claim:

A self-contained, portable device for testing the condenser of an automobile having a battery to facilitate the operation of the automobile, comprising a connection adapted to be connected to the battery, a connection adapted to be connected to the frame of the automobile, a condenser connection adapted to be connected to the power side of the condenser while in normal operative position on said automobile, a testing indicator connected to the condenser testing connection, a vibrator connected to the battery connection, a transformer for the vibrator, a rectifier connected to the transformer, and a double-throw switch adapted alternately to connect the indicator to the rectifier and to the frame of the automobile.

BENJAMIN PAUL.